Aug. 3, 1926.  
G. R. WOOD  
1,594,399  
FEEDING DEVICE FOR MEAT SLICING MACHINES  
Filed June 1, 1923  
3 Sheets-Sheet 1
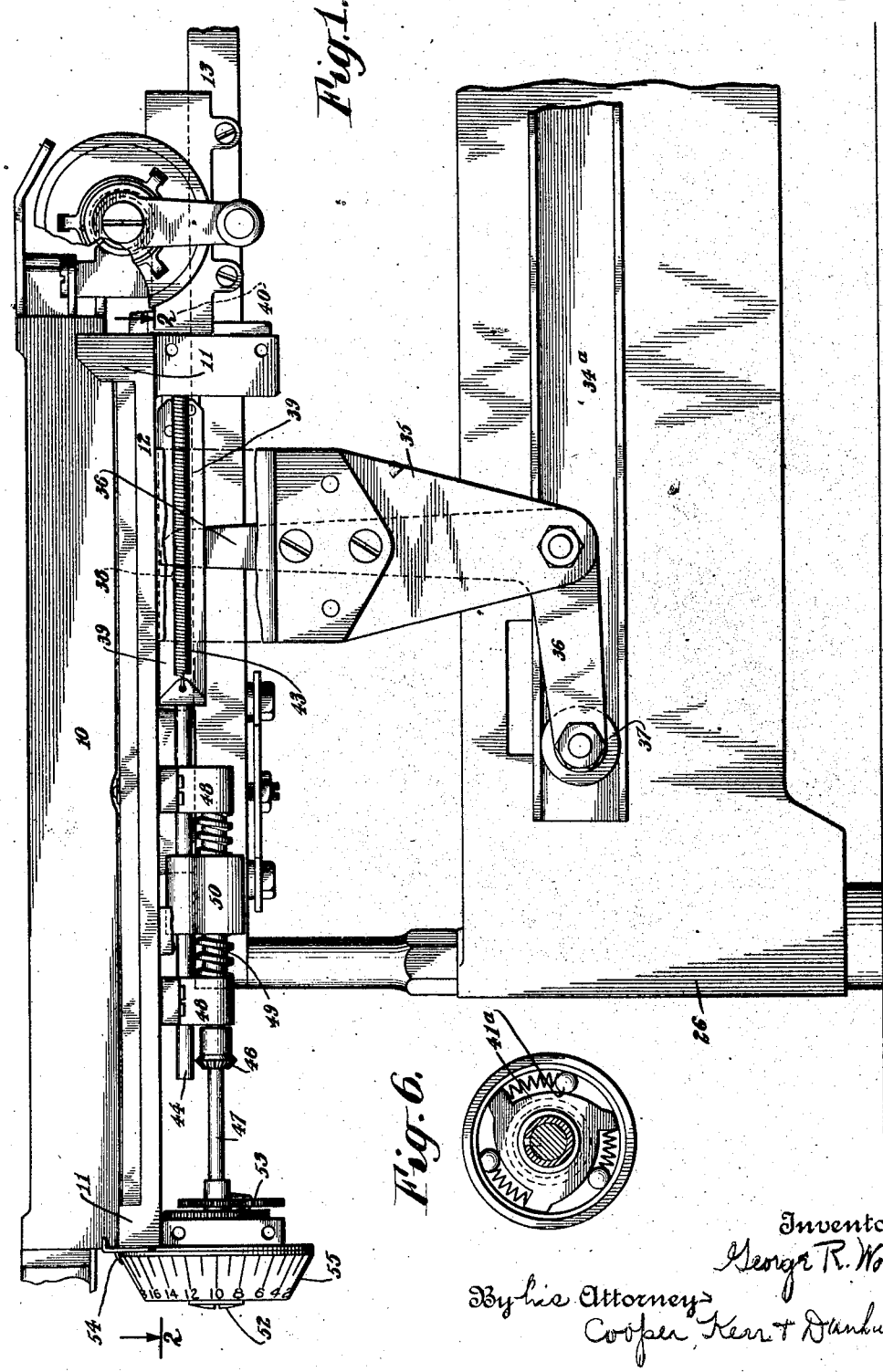

Aug. 3, 1926.
G. R. WOOD
1,594,399
FEEDING DEVICE FOR MEAT SLICING MACHINES
Filed June 1, 1923      3 Sheets-Sheet 2
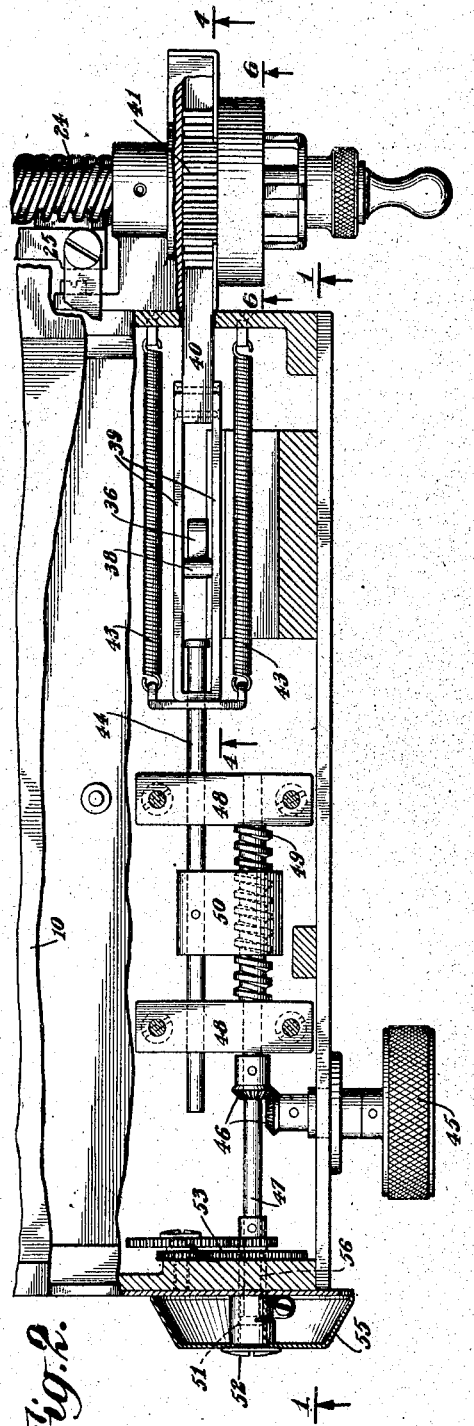
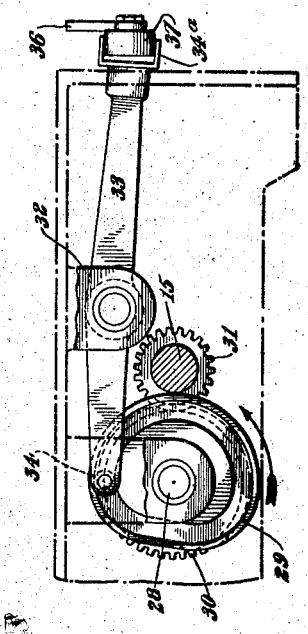
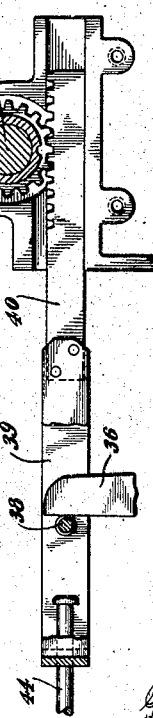
Inventor
George R. Wood
By his Attorneys
Cooper, Kerr & Dunham

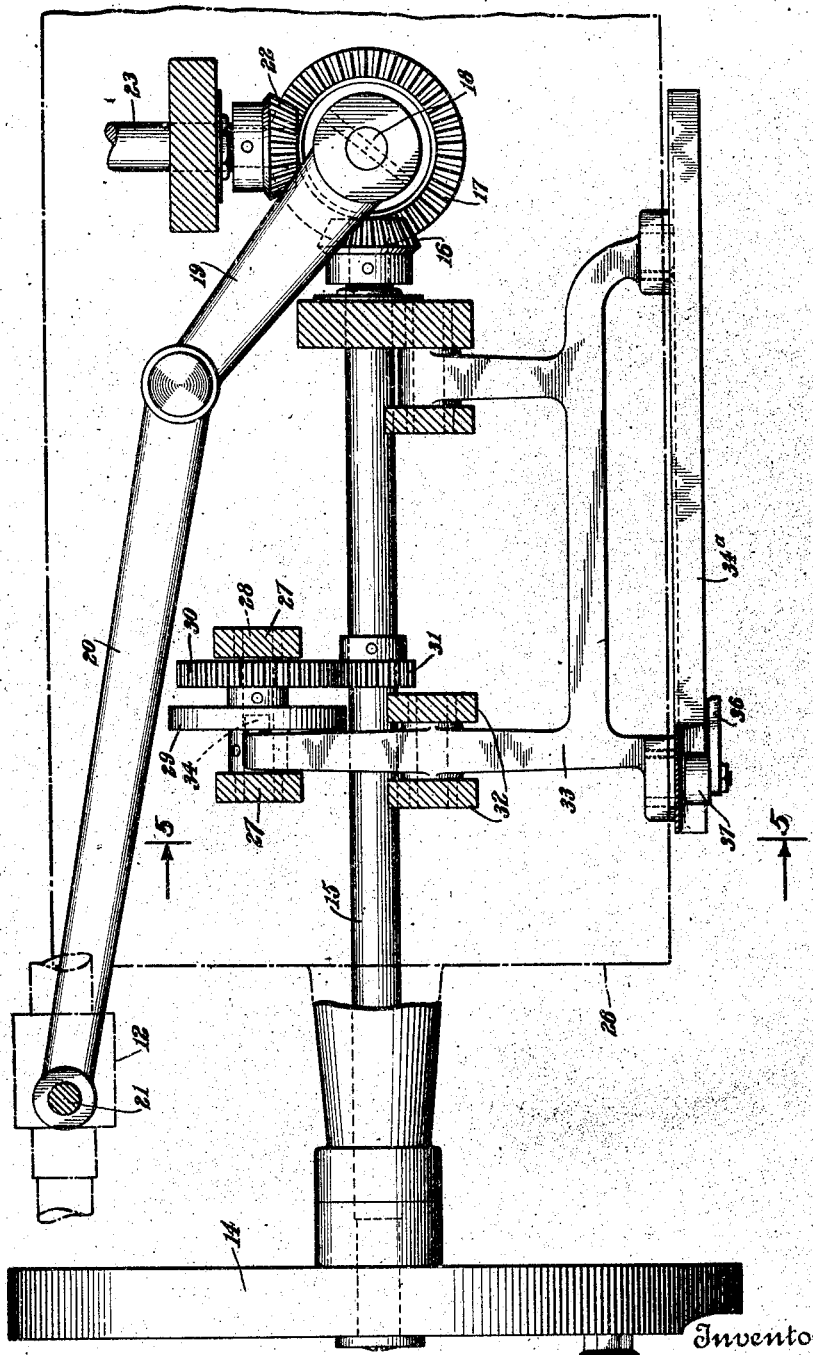

Patented Aug. 3, 1926.

1,594,399

UNITED STATES PATENT OFFICE.

GEORGE RUE WOOD, OF DAYTON, OHIO, ASSIGNOR TO DAYTON SCALE COMPANY, OF DAYTON, OHIO, A CORPORATION OF NEW JERSEY.

FEEDING DEVICE FOR MEAT-SLICING MACHINES.

Application filed June 1, 1923. Serial No. 642,731.

This invention is directed to improved feeding devices for meat slicing machines and more particularly to improvements in the means for feeding the meat plate transversely upon the reciprocating meat table.

The objects of the present invention reside in simplification and improvement of feeding devices whereby the operation of cross feeding may be more effectively carried out.

Further object resides in the arrangement of the feeding devices to the general end that extreme silence of operation may be secured irrespective of the extent of feed.

Further objects reside in the improvement and simplification of the means for adjusting the extent of cross feed.

Further objects and advantages will be hereinafter set forth in the accompanying specification and claims and shown in the drawings which by way of illustration show a preferred embodiment of the invention.

In the drawings:

Fig. 1 shows a side elevation of the slicing machine with one of the side cover plates removed. The view is taken substantially on line 1—1 of Fig. 2.

Fig. 2 is a top view of the parts shown in Fig. 1 with portions of the meat table structure broken away to show the parts thereunder. This view is taken on line 2—2 of Fig. 1.

Fig. 3 is a top view of the driving parts within the base of the slicing machine.

Fig. 4 is a detail view taken on line 4—4 of Fig. 2.

Fig. 5 is a detail view taken on line 5—5 of Fig. 3.

Fig. 6 is a detail sectional view of the ball and ratchet device. The section is taken on line 6—6 of Fig. 2.

The slicing machine to which my improved table-feeding is applied is shown more fully in my copending application Serial No. 645,139, filed June 13, 1923.

Like all slicing machines, as generally used, the machine comprises a meat plate structure 10 slidably mounted upon transverse rails 11 which rails are carried by a frame or so-called table structure 12. This table in turn is slidably mounted upon suitable guide rails carried by the base 26 of the machine. One of the rails 13 is shown in Fig. 1.

For reciprocating the frame or table back and forth the mechanism shown in Fig. 3 is provided. The hand or fly wheel 14 is fixed on shaft 15 and this shaft in turn through bevel gears 16 and 17 drives a crank shaft 18. The latter shaft through the crank and link 19—20 directly reciprocates the frame through a suitable pivot stud 21. Bevel gear 22 and shaft 23 are those commonly used in meat slicing machines for driving the chain which rotates the knife.

As is customary in meat slicing machines, a lead screw 24 is provided suitably journaled in the table or frame 12 and a nut 25 which is supported upon the meat plate is adapted to engage the lead screw whereby upon rotating the lead screw the meat plate will advance transversely with respect to the direction of reciprocation of the table.

The present improvements are particularly directed to the provision of means for imparting step-by-step rotational movements to the lead screw. In meat slicing machines it is desirable that the lateral feed of the meat plate occur at such time when the table is at or near the end of its reciprocating stroke and when the meat is clear of the knife. It is further desirable that a comparatively large extent of cross feed may be obtained to the end that thick slices may be cut by the slicing machine. Furthermore, the mechanism is most readily adjustable and extremely silent in operation. Various expedients have heretofore been employed which only in part accomplish the desired results.

In providing mechanism for actuating the cross feed when the meat table is at or near the end of the stroke, it is undesirable to drive the lateral feed device from the meat table itself, particularly when large feeding movements are desired. In the present embodiment, I provide for the drive as follows.

Suitable lugs 27, fixed to the base of the machine, support a rotatable shaft 28 which is disposed adjacent to and parallel to shaft 15. Fixed to this shaft is a box cam 29 and a gear 30. Fixed to the shaft 15 is a small pinion 31 which is substantially one-half of the diameter of its intermeshing gear 30. Also supported by lugs 32 in the base of the machine is a rocking frame 33 having an arm carrying a follower roller 34 coacting with the cam 29 so as to be rocked up and down thereby upon the rotation of the supplementary shaft 28. The frame 33 has arms which extend through openings in the base of the machine (see Fig. 1) and carry upon their ends a horizontally extending bar, preferably a channel-shaped member 34ᵃ. The reciprocating table 12 carries a bracket 35 which pivotally supports a bell-crank member 36 having a roller 37 engaging in the channel 34ᵃ. It will be understood that the channel construction permits the bell-crank to slide back and forth as the table reciprocates and that no noise or shock will be caused thereby. The rocking movement of the frame 33 which takes place towards the end of the stroke of the table will cause the frame to be lowered, thus causing the bell crank 36 to be rocked anticlockwise. The upper end of the bell-crank contacts with a roller 38 carried by two rods 39 which in turn are connected to a rack 40. The rack meshes with a pinion 41 which, through suitable ratchet devices 41ᵃ (Fig. 6) are adapted to drive the lead screw 24. The details of these ratchet devices are more fully described in my copending application heretofore referred to.

The actual feeding takes place upon the anticlockwise rocking of the bell-crank. To restore the rack rod and associated parts and at the same time permit the adjustment of the feed, I provide springs 43 fixed at one end and at the other connected to a saddle which is suitably connected to the rods 39. These springs restore the rack rod preparatory to the next feed. The extent of feed is determined by means of a slidably adjustable plunger 44 which plunger is provided with a head which limits the extent of restoration of the rods 39.

To adjust the position of the plunger, I provide an adjusting knob 45 which, through bevel gears 46, turns a shaft 47. This shaft is rotatably mounted in brackets 48 depending from the meat table or carriage and is provided with a worm portion 49 engaging a threaded block 50 fixed to the plunger 44.

To indicate the thickness of the slice for which the machine is set, I provide an indicating disc or dial 55. This dial is fixed to a boss 51 by a screw 52. The boss in turn is fixed to a stub shaft 56 which in turn is connected to shaft 47 by reducing gearing 53. A suitable pointer or index 54 carried by one of the side plates of the machine projects over the graduated wheel and indicates to the user the thickness of slice for which the machine is adjusted.

With the structure herein described, the actuation of the cross feeding devices is effected by the rotation of the supplementary shaft and the action is entirely independent of the crank shaft action or of the reciprocating parts of the table. By the provision of the supplementary shaft, the rocking frame may be directly actuated thereby in a positive manner at any desired time in the machine cycle. In addition, the connection for rotating the lead screw from the rocking frame may be effected in an extremely direct manner without the utilization of complicated linkage. The adjusting devices for varying the cross feed may be readily disposed upon the reciprocating table and arranged so as to act to vary the effective feeding movement which is available from the bell crank member. This member has a constant throw or displacement for each complete up or down rocking movement of the frame. This arrangement of feeding action parts not only minimizes the number of parts required and permits easy adjustment, but also the action as a whole is more silent and efficient in its operation than those heretofore employed. My feeding mechanism also permits the securing of the maximum desired amount of cross feed for slicing excessively thick slices. The feeding movement may be readily used to take place at any desired time in the machine cycle by properly arranging the contour of the cam 29.

What I claim is—

1. A cross feeding device for a machine having a reciprocating table and a transversly displaceable tray and including a lead screw carried by the table and engaging said tray to displace the same transversely upon the rotation othereof, ratchet devices connected to said lead screw and means for periodically rotating said lead screw through said ratchet devices comprising in combination, a pinion to actuate the ratchet devices, a rack meshing with said pinion, means for periodically actuating the said rack comprising, a main shaft, a supplementary shaft disposed parallel to and geared to the main shaft, a cam carried by the said supplementary shaft, a rocking frame journalled in a fixed part of the machine and rocked by said cam, a channel carried by the frame, a bell crank carried by the reciprocating table and engaging said channel and means connected to said rack adapted for engagement by said bell crank for actuating the rack upon the rocking of the frame.

2. A cross feeding device for the lead screw of a slicing machine, having a reciprocating table and a transversely displaceable tray, comprising, a rocking frame pivotally supported in the base of the machine, a cam driven by the machine for rocking said frame, a straight bar carried by said frame, a member traveling with the table and engaging said bar so as to be actuated thereby upon the rocking of the frame, and means actuated by said member for rotating a lead screw to transversely displace the tray.

3. A cross feeding device for the lead screw of a slicing machine having a reciprocating table, and a transversely displaceable tray comprising in combination with a drive shaft of the machine, of a horizontally extending bar, means operated by the drive shaft for vertically displacing the horizontal bar, means travelling with the table and slidably engaging said bar, said means being displaced upon the vertical displacement of said bar, and means displaceable by said last named means for rotating the lead screw.

4. In a meat slicing machine having a reciprocating table, a tray transversely displaceable thereon, and a lead screw therefor, comprising, in combination with the main drive shaft of the machine, a rocking frame having a horizontally extending straight slide portion, means operated from the main drive shaft for rocking said frame at approximately the time when the table is at the end of its stroke, means slidably engaging said horizontal portion of the frame and adapted for displacement upon the rocking of the frame and means operated by said last named means for rotating the lead screw.

5. An adjusting means for varying the cross feed of a meat tray upon a slicing machine, comprising a rack and pinion, means for positively displacing said rack in one direction, means for resiliently displacing said rack in the opposite direction, and limiting devices with provisions for variably setting the same for variously limiting the return movement of the rack under the influence of the resilient means.

6. In a slicing machine having a rack and pinion for rotating the lead screw thereof, means for positively displacing the rack in one direction, means for resiliently returning the rack, a plunger for limiting the return movement of the rack, and means for variably setting the said plunger.

7. The invention set forth in claim 6 in which the means for setting the plunger comprises a rotatable knob, a worm geared thereto and a block engaged by the said worm and connected to the plunger.

8. A cross feed adjusting device for a slicing machine, comprising in combination, a setting knob, an index wheel, multiple gears intermediate the index wheel and knob, a plunger for variably controlling the extent of feed, and gearing including a worm and nut intermediate the knob and plunger for the purpose described.

9. In a meat slicing machine having a rack and pinion for actuating the lead screw thereof, a travelling bell crank adapted to be rocked for displacing the rack in one direction, spring means for returning the rack in the opposite direction, means for limiting the extent of return of the rack, an index wheel, and a setting knob connected to the said limiting means and index wheel.

10. In a meat slicing machine having a reciprocating table and a transversely displaceable meat plate, in combination, a lead screw for the meat plate, a main drive shaft, a crank for reciprocating the table, a crank shaft therefor, and means for actuating the lead screw, said means being driven by said main drive shaft by means independent of the crank shaft and of the parts driving said shaft from said main drive shaft.

11. In a meat slicing machine having a reciprocating table, a transversely displaceable meat plate thereon, and a lead screw for advancing said plate, in combination, a main drive shaft, means driven thereby for reciprocating the table, and means independent of the aforesaid last mentioned means and of the parts actuated thereby for actuating the lead screw to effect the transverse feed of the meat plate.

12. In a meat slicing machine having a reciprocating table and a transversely displaceable meat plate thereon, means carried by the table and including a lead screw for transversely displacing said table, in combination with a main drive shaft, means driven thereby for reciprocating the table, and means driven by the main drive shaft for actuating the transverse plate feeding means, said last mentioned means being independent of the aforesaid means for reciprocating the table or of the parts actuated thereby and including a rocking frame, a member travelling with the table and engaging said frame, and means actuated by said member for effecting the rotation of the lead screw.

13. In a slicing machine, a main drive shaft, a supplementary shaft geared to the main shaft to rotate concurrently therewith and parallel therewith, a reciprocating meat table and a transversely displaceable meat plate thereon, means for feeding said plate transversely comprising a lead screw, and means directly responsive to the rotation of said supplementary shaft for actuating the aforesaid means to effect the feed.

14. In a slicing machine, a main drive shaft, a reciprocating table, a meat plate transversely displaceable thereon, a rocking frame, means responsive directly to the rotation of the main shaft for positively rocking said frame in both directions, a lead screw carried by the table for advancing the plate, and means travelling with said table and having a part thereof directly engaging said frame for actuating the lead screw.

15. The invention set forth in claim 14 which comprises variable setting devices for varying the extent of rotation of the lead screw, said devices being disposed intermediate the part travelling with the table which engages the frame and the lead screw.

16. A cross feed device for a meat slicer having a reciprocating table and a transversely displaceable meat plate, comprising a lead screw carried by the table, adjusting means carried by the table for varying the extent of rotation of said lead screws, a main drive shaft, and means driven thereby for actuating the lead screw, said means coacting with the aforesaid adjusting means.

17. A cross feed device for a meat slicer having a reciprocating table and a transversely displaceable meat plate, comprising a lead screw carried by the table, means for actuating said lead screw comprising a rocking frame, a main drive shaft, means driven by said shaft and independent of the means for reciprocating the table for rocking said frame a determined amount at each machine cycle, and means coacting with said frame and including variable stroke devices carried directly by said table for effecting the rotation of said lead screw to variable extents.

In testimony whereof I hereto affix my signature.

GEORGE RUE WOOD.